(12) United States Patent
Takahashi et al.

(10) Patent No.: US 11,126,859 B2
(45) Date of Patent: Sep. 21, 2021

(54) ROBOT SYSTEM

(71) Applicant: FANUC CORPORATION, Yamanashi (JP)

(72) Inventors: Yuuki Takahashi, Yamanashi (JP); Atsushi Watanabe, Yamanashi (JP); Minoru Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 107 days.

(21) Appl. No.: 16/565,857

(22) Filed: Sep. 10, 2019

(65) Prior Publication Data

US 2020/0134322 A1    Apr. 30, 2020

(30) Foreign Application Priority Data

Oct. 31, 2018    (JP) .............................. JP2018-204895

(51) Int. Cl.
*G06K 9/00* (2006.01)
*G06T 7/70* (2017.01)
(Continued)

(52) U.S. Cl.
CPC ............ *G06K 9/00771* (2013.01); *G06T 7/62* (2017.01); *G06T 7/70* (2017.01); *G06T 17/00* (2013.01); *G06T 19/006* (2013.01)

(58) Field of Classification Search
None
See application file for complete search history.

(56) References Cited

U.S. PATENT DOCUMENTS

2010/0315215 A1* 12/2010 Yuda ..................... G08G 1/167
                                                      340/435
2012/0327190 A1    12/2012 Massanell et al.
(Continued)

FOREIGN PATENT DOCUMENTS

JP    S60-255392 A    12/1985
JP    S61-248167 A    11/1986
(Continued)

OTHER PUBLICATIONS

Kiyoto et al., Machine translated Japanese patent No. JP5027270, Sep. 2012 (Year: 2012).*

(Continued)

*Primary Examiner* — Saptarshi Mazumder
(74) *Attorney, Agent, or Firm* — Maier & Maier, PLLC

(57) ABSTRACT

Provided is a robot system including a robot, a distance image sensor that temporally continuously acquires, from above an operating space of the robot, distance image information around the operating space, and an image processing device that processes the acquired distance image information, the image processing device defining, around the operating space, a monitoring area that includes a boundary for enabling entrance into the operating space from the outside, including a storing unit that stores reference distance image information, and detecting, based on the distance image information acquired by the distance image sensor and the reference distance image information stored in the storing unit, whether a stationary object present in the monitoring area is blocking the boundary in a visual field of the distance image sensor.

8 Claims, 7 Drawing Sheets

(51) Int. Cl.
*G06T 19/00* (2011.01)
*G06T 17/00* (2006.01)
*G06T 7/62* (2017.01)

(56) References Cited

U.S. PATENT DOCUMENTS

| | | | |
|---|---|---|---|
| 2014/0207285 A1* | 7/2014 | Sakabe | B25J 9/1676 |
| | | | 700/259 |
| 2017/0355079 A1 | 12/2017 | Takahashi | |
| 2018/0236665 A1 | 8/2018 | Takahashi et al. | |

FOREIGN PATENT DOCUMENTS

| | | |
|---|---|---|
| JP | H05-038655 A | 2/1993 |
| JP | H07-024767 A | 1/1995 |
| JP | 2007-183432 A | 7/2007 |
| JP | 2008-092459 A | 4/2008 |
| JP | 2011-215772 A | 10/2011 |
| JP | 2013-210903 A | 10/2013 |
| JP | 2016-099257 A | 5/2016 |
| JP | 2017-221985 A | 12/2017 |
| JP | 2018-130814 A | 8/2018 |

OTHER PUBLICATIONS

Japanese Office Action dated Nov. 4, 2020, in connection with corresponding JP Application No. 2018-204895 (7 pp., including machine-generated English translation).

Japanese Search Report dated Oct. 30, 2020, in connection with corresponding JP Application No. 2018-204895 (20 pp., including machine-generated English translation).

* cited by examiner

ROBOT SYSTEM

CROSS-REFERENCE TO RELATED APPLICATIONS

This application claims the benefit of Japanese Patent Application No. 2018-204895, the content of which is incorporated herein by reference.

FIELD

The present invention relates to a robot system.

BACKGROUND

There has been known a robot system that, in distance images continuously acquired by a distance image sensor disposed above a work table, sets, around an operating space of a robot, a monitoring area having a boundary and causes, according to detection of an operator or the like entering the monitoring area through the boundary, the robot to perform danger avoiding operation (see, for example, PTL 1).
Japanese Unexamined Patent Application, Publication No. 2017-221985

SUMMARY

According to an aspect of the present invention, there is provided a robot system including: a robot; a distance image sensor that temporally continuously acquires, from above an operating space of the robot, distance image information around the operating space; and an image processing device that processes the distance image information acquired by the distance image sensor, the image processing device defining, around the operating space, a monitoring area that includes a boundary for enabling entrance into the operating space from an outside, including a storing unit that stores reference distance image information, which is the distance image information of the boundary of the monitoring area in a state in which an object is absent in the monitoring area, and detecting, based on the distance image information acquired by the distance image sensor and the reference distance image information stored in the storing unit, whether a stationary object present in the monitoring area is blocking the boundary in a visual field of the distance image sensor.

DETAILED DESCRIPTION

A robot system 1 according to an embodiment of the present invention is explained below with reference to the drawings.

Figure 1:
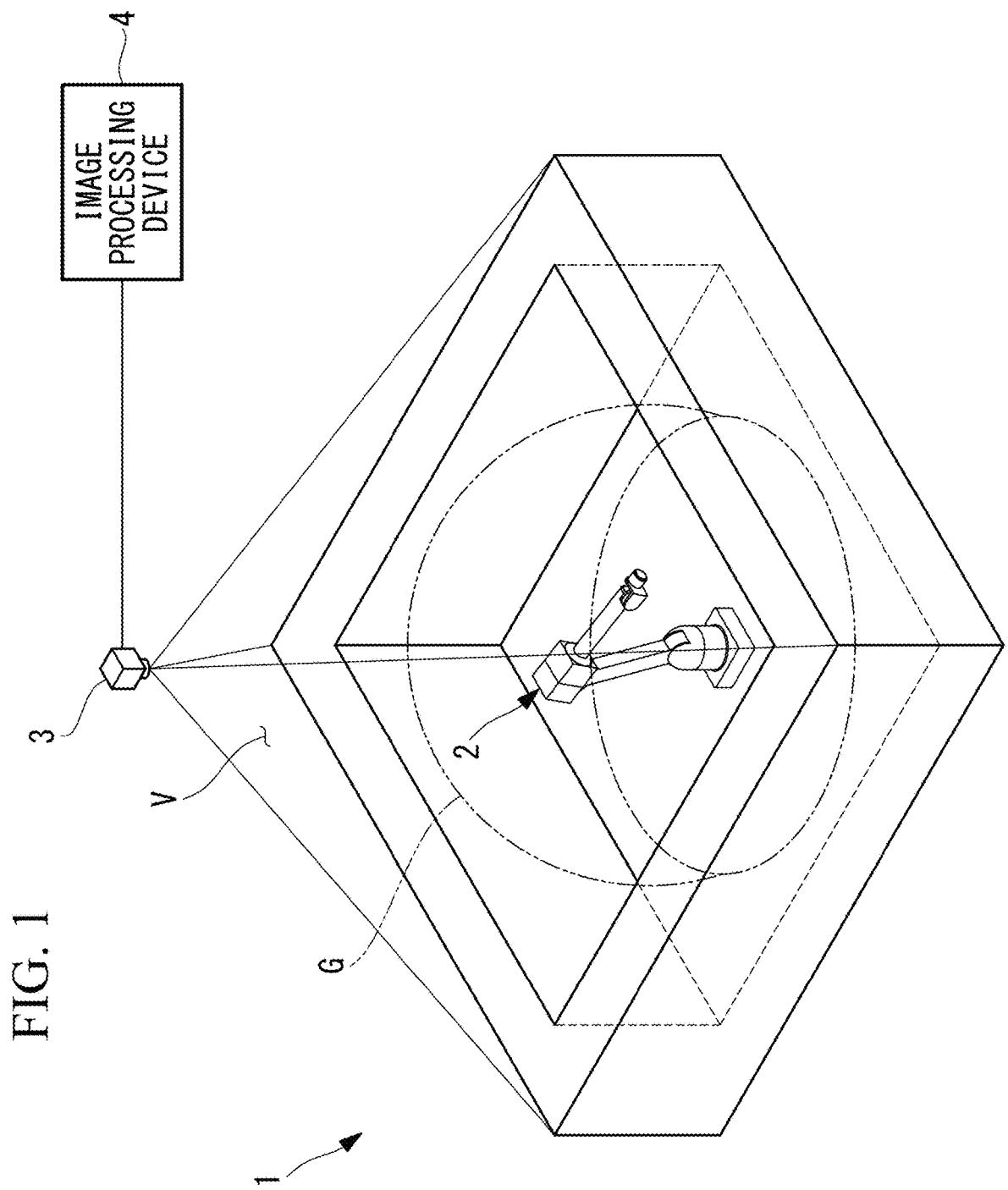
FIG. 1 is an overall configuration diagram showing a robot system according to an embodiment of the present invention.

The robot system 1 according to this embodiment includes, as shown in FIG. 1, a robot 2, a security camera (a distance image sensor) 3 disposed above an operating range (an operating space) G of the robot 2, and an image processing device 4 connected to the security camera 3.

In an example shown in FIG. 1, the robot 2 is, for example, a six-axis articulated type robot and includes a spherical operating range G.

As the security camera 3, a stereo camera or a distance image sensor of a TOF (Time of flight) type can be used. The security camera 3 can acquire, for each of pixels, a distance image (distance image information) obtained by detecting a distance from a lens center of the security camera 3.

Figure 2:
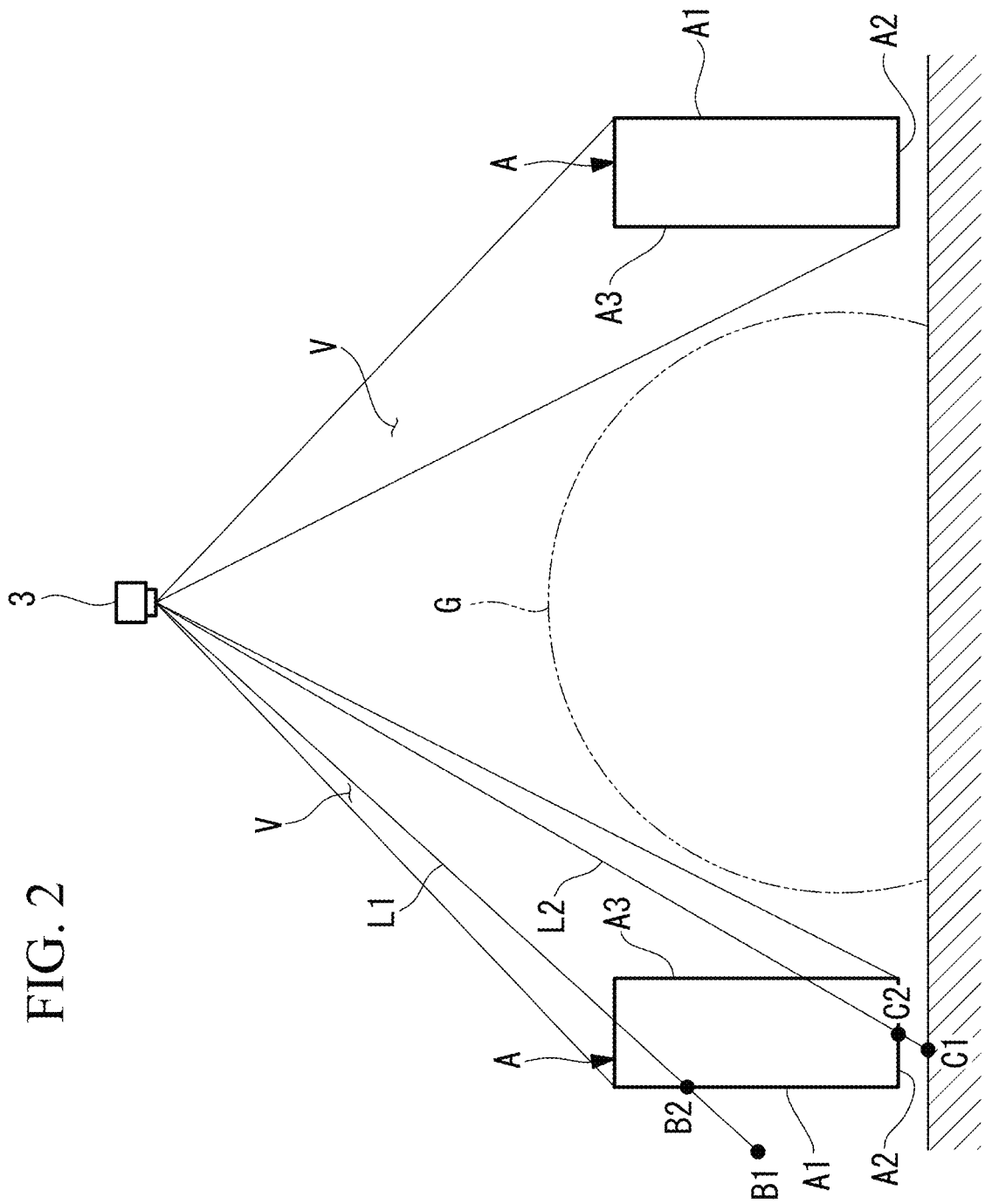
FIG. 2 is a side view showing a robot system shown in FIG. 1.
Figure 3:
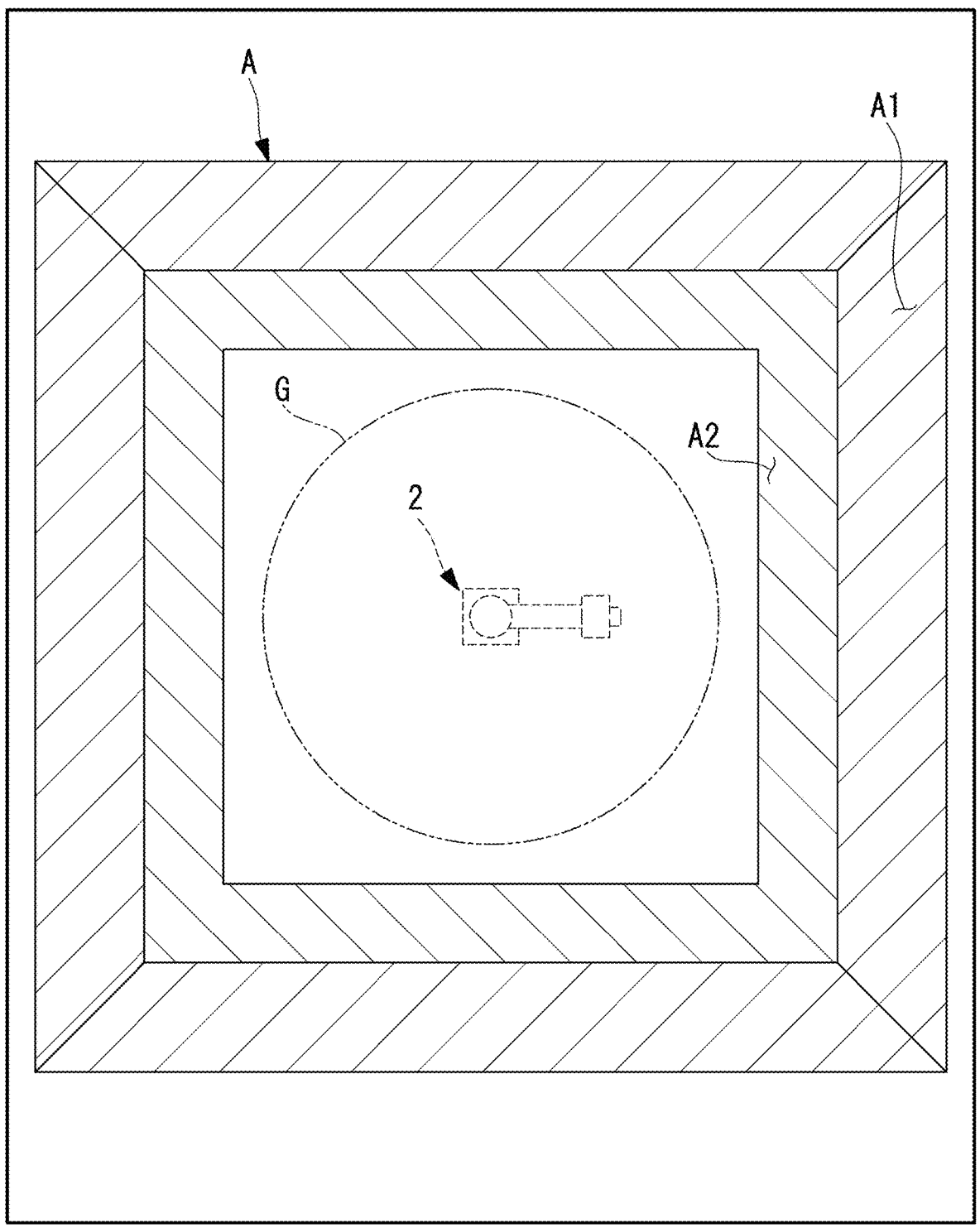
FIG. 3 is a diagram showing an example of a distance image of an outer surface of a monitoring area and an example of a distance image of a bottom surface of the monitoring area acquired by the robot system shown in FIG. 1.

As shown in FIG. 1 and FIG. 2, the security camera 3 has a field of view V in which the security camera 3 is capable of photographing a range surrounding the entire circumference of the operating range G of the robot 2 without interfering with the operating range G of the robot 2. That is, the field of view V of the security camera 3 radially extends from the lens center and expands to an annular range not including the operating range G of the robot 2. The distance image acquired by the security camera 3 is, for example, as shown in FIG. 3. In the figure, a region indicated by hatching is the distance image.

The image processing device 4 is configured by a processor and a memory. The image processing device 4 defines a monitoring area A as shown in FIG. 2 in the distance image acquired by the security camera 3. The monitoring area A is, for example, a square annular region having a rectangular fixed cross-sectional shape and, as shown in FIG. 2, disposed in a position surrounding the entire circumference on the outer side of the operating range G of the robot 2. In FIG. 3, the distance image corresponds to an outer surface A1 of the monitoring area A and a bottom surface A2 of the monitoring area A shown in FIG. 2.

The security camera 3 acquires, concerning the pixels, distance information to an object present in the field of view V. However, a region further on the outer side than the outer surface (a boundary) A1 of the monitoring area A and a region further on the lower side than the bottom surface A2 of the monitoring area A are excluded from a monitoring target depending on the size of the distance information.

That is, a point B1 present further on the outer side than the outer surface A1 of the monitoring area A shown in FIG. 2 is disposed in a position farther than the outer surface A1 of the monitoring area A on a straight line L1 connecting the point B1 and the lens center of the security camera 3. Therefore, distance information of a pixel corresponding to the point B1 in the distance image is larger than distance information of a point B2 on the outer surface A1 of the monitoring area A corresponding to the same pixel. Therefore, the image processing device 4 can exclude the point B1 from the monitoring target considering that the point B1 is a point outside the monitoring area A.

A point C1 present further on the lower side than the bottom surface A2 of the monitoring area A shown in FIG. 2 is disposed in a position farther than the bottom surface A2 of the monitoring area A on a straight line L2 connecting the point C1 and the lens center of the security camera 3. Therefore, distance information of a pixel corresponding to the point C1 in the distance image is larger than distance information of a point C2 on the bottom surface A2 of the monitoring area A corresponding to the same pixel. Therefore, the image processing device 4 can exclude the point C1 from the monitoring target considering that the point C1 is a point outside the monitoring area A.

A stationary object (see FIG. 5) X present in the monitoring area A, for example, an object maintained in a standstill state such as a table or a control device is excluded from the monitoring target by being set as the stationary object X.

In this case, in this embodiment, the image processing device 4 detects, using a distance image obtained by the security camera 3, whether the stationary object X present in the monitoring area A is blocking the outer surface (the boundary) A1 of the monitoring area A in the field of view (the visual field) V of the security camera 3.

Specifically, the image processing device 4 includes a storing unit (not shown in the figure) that stores a first reference distance image, which is a distance image of each of the outer surface A1 and the bottom surface A2 of the monitoring area A in a state in which the stationary object X is not disposed. The image processing device 4 can detect the stationary object X from a difference between the distance image acquired by the security camera 3 and the reference distance image.

When the stationary object X is detected, the image processing device 4 detects whether the detected stationary object X hangs over a part of a region that should originally be the outer surface A1 or an inner surface A3 of the monitoring area A.

Figure 4:
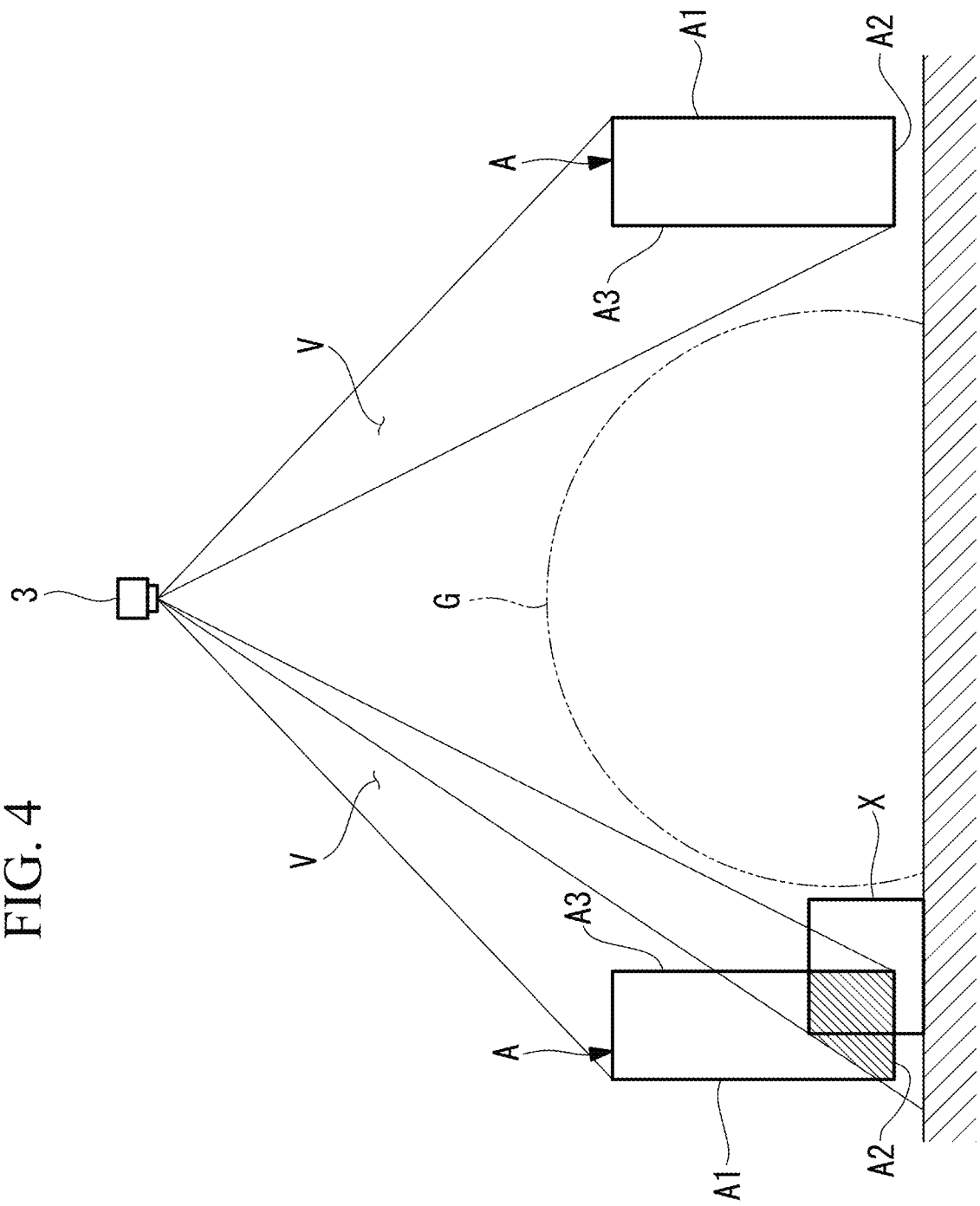
FIG. 4 is a side view showing an example of a case in which a stationary object is disposed in the monitoring area in the robot system shown in FIG. 2.
Figure 5:
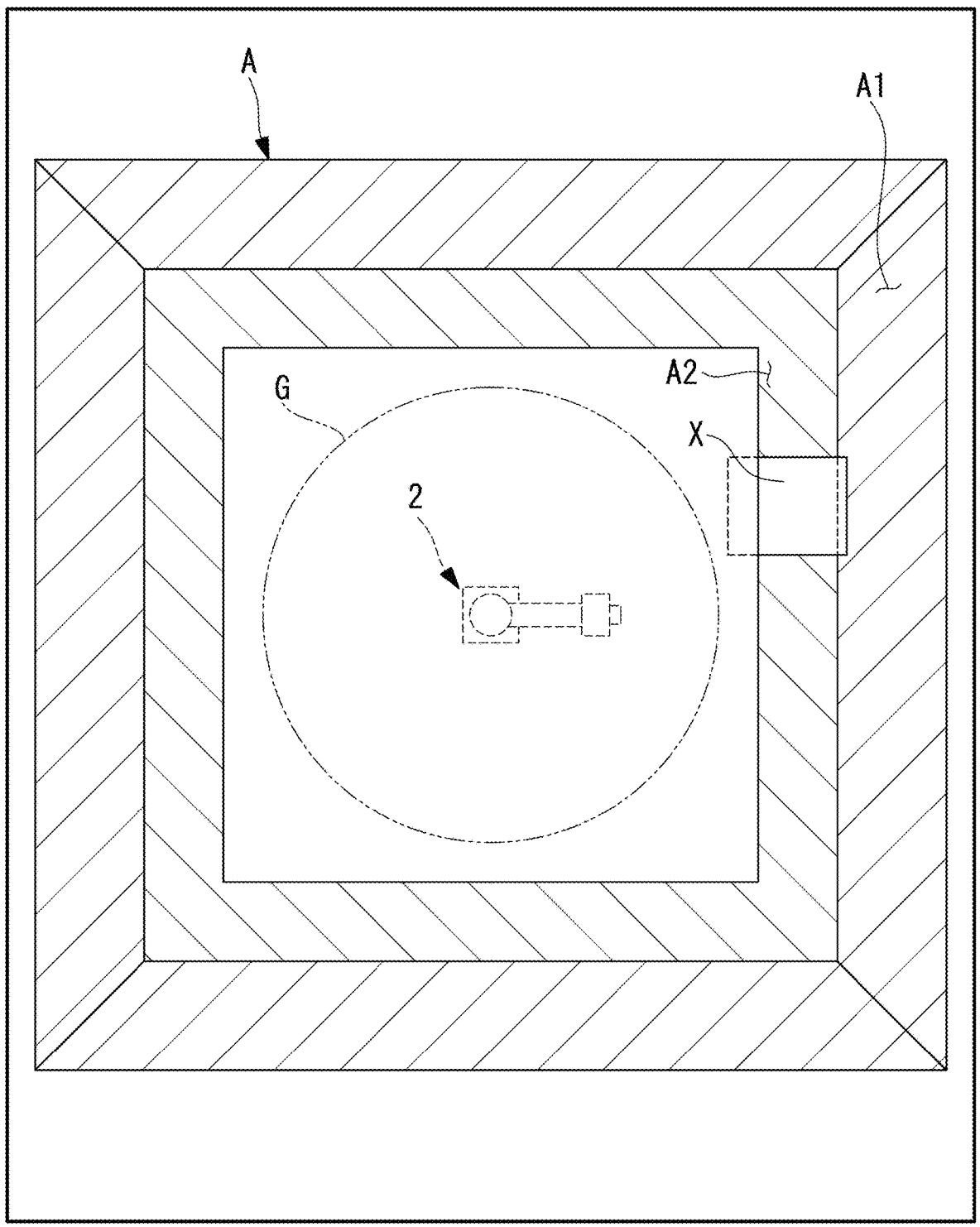
FIG. 5 is a diagram showing an example of a distance image of the outer surface of the monitoring area and an example of a distance image of the bottom surface of the monitoring area in the case of FIG. 4.

An example of the reference distance image is shown in FIG. 3. A side view of the stationary object X disposed in the monitoring area A is shown in FIG. 4. An example of a distance image of the outer surface A1 of the monitoring area A and an example of a distance image of the bottom surface A2 of the monitoring area A are shown in FIG. 5. A differential image between the reference distance image shown in FIG. 3 and the distance image shown in FIG. 5 is shown in FIG. 6.

A hatched region in the monitoring area A in FIG. 4 is a blind spot formed in the monitoring area A by the stationary object X. In an example shown in FIG. 4, the blind spot is formed to partially hang over a part of the outer surface A1 of the monitoring area A.

Figure 6:
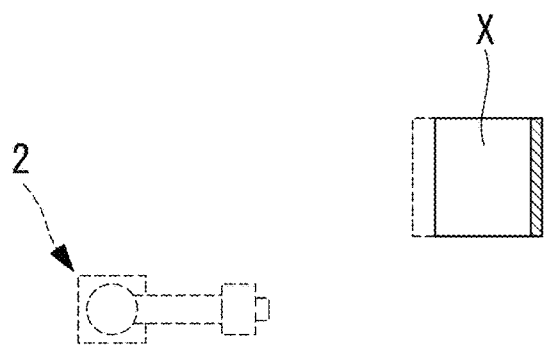
FIG. 6 is a diagram showing a differential image between the distance image shown in FIG. 5 and the distance image shown in FIG. 3.

In FIG. 6, a hatched region indicates a region where the outer surface A1 of the monitoring area A is blocked by the stationary object X.

In this region, since the stationary object X is disposed in a position closer to the security camera 3 than the outer surface A1 of the monitoring area A, distance information smaller than the distance information of the outer surface A1 is acquired in pixels in these regions. Consequently, it is possible to detect that the outer surface A1 of the monitoring area A is blocked by the stationary object X.

That is, when the field of view V is blocked because the stationary object X hangs over the region that should be the outer surface A1 of the monitoring area A, there is possibility that the operator or the like enters, without being detected by the distance image sensor, the monitoring area A from a blocked outer surface A1 portion through a blind spot hidden by the stationary object X.

It is possible to grasp presence or absence of the possibility of the entrance through the blind spot formed by the stationary object X by detecting presence or absence of the outer surface A1 blocked by the stationary object X. When it can be determined that there is the possibility of the entrance, it is possible to apply measures for preventing the entrance of the operator or the like by moving the stationary object X to a position where the stationary object X does not block the outer surface A1 or the inner surface A3 in the field of view V or providing, on the outer side of the outer surface A1 of the monitoring area A, a wall for closing, in advance, a path leading to the blind spot.

In this way, with the robot system 1 according to this embodiment, it is detected whether the field of view V of the security camera 3 is blocked in the region overlapping the outer surface A1 of the monitoring area A by the stationary object X disposed in the monitoring area A. Therefore, there is an advantage that it is possible to grasp presence or absence of possibility of entrance of the operator or the like through the blind spot formed by the stationary object X.

Note that, in this embodiment, the image processing device 4 may calculate size of a space blocked by the stationary object X. The robot system 1 may include an informing unit that, when the calculated size of the space exceeds a predetermined threshold, informs to that effect. As the informing unit, it is possible to adopt a unit that informs with any method such as sound, light, or screen display.

Figure 7:
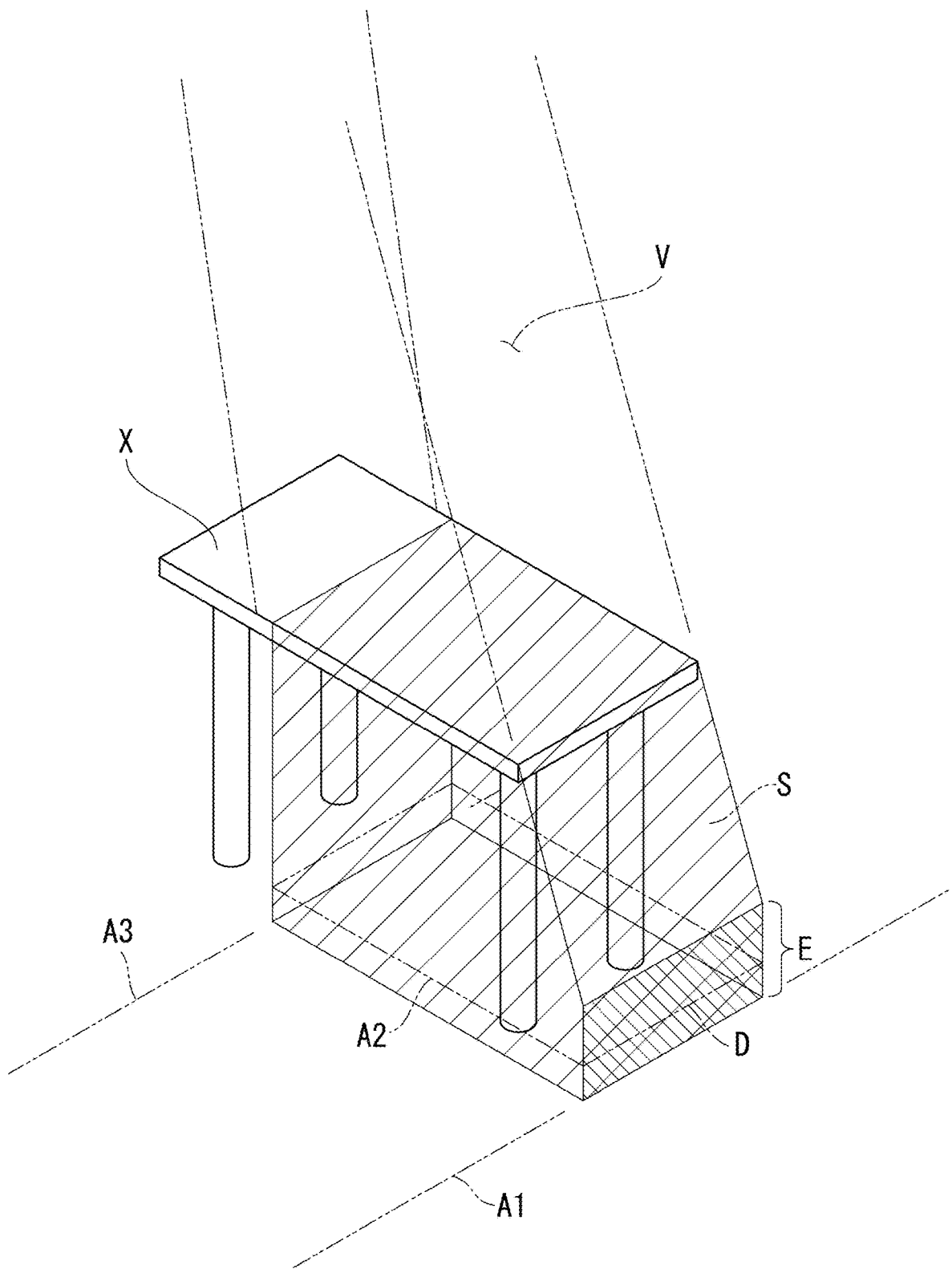
FIG. 7 is a perspective view showing an example of a blind spot formed by the stationary object disposed in the monitoring area shown in FIG. 4.

Examples of the size of the space include, as shown in FIG. 7, a capacity S of a space (a hatched region) blocked by the stationary object X in the monitoring area A, a minimum cross-sectional area D of the space, and a minimum dimension E of a cross section of the space. In FIG. 7, the space forming the blind spot is a space added with a space below the bottom surface A2 of the monitoring area A.

When the stationary object X is blocking the field of view V of the security camera 3 on the inner surface A3 of the monitoring area A and the space has a capacity larger than a capacity for enabling a human to hide, a human hiding in the blind spot by the stationary object X before the start of the robot system 1 can enter the operating range G of the robot 2 without being detected by the security camera 3. Therefore, the capacity S of the space needs to be kept sufficiently small.

When the minimum cross-sectional area D of the space or the minimum dimension E of the cross section of the space has size for enabling a human or a part of the body of the human, for example, an arm or a leg to pass, the human or the part of the human can enter the operating range G of the robot 2 without being detected by the security camera 3. Therefore, the minimum cross-sectional area D of the space or the minimum dimension E of the cross section of the space also needs to be kept sufficiently small.

The image processing device 4 may include a display unit. The display unit is a monitor. The display unit displays the space blocked by the stationary object X. The space may be displayed in a different color in the distance image.

The image processing device 4 may include a three-dimensional-model generating unit that generates a three-dimensional model of the space. The display unit may display the generated three-dimensional model of the space.

As the three-dimensional model of the space, a three-dimensional model of the space itself may be directly generated. Alternatively, by generating a three-dimensional model of the monitoring area A, the space blocked by the stationary object X may be indirectly displayed according to presence or absence of a region where the three-dimensional model of the monitoring area A is lost.

By displaying the three-dimensional model, it is possible to confirm the shape of the space blocked by the stationary object X while varying a viewing angle.

The robot system 1 may include a photographing unit that photographs the robot 2 and the periphery of the robot 2. The display unit may superimpose and display the three-dimensional model on an image acquired by the photographing unit. Consequently, since the blind spot formed by the stationary object X is displayed on the display unit as a three-dimensional model to be superimposed and displayed on an image of the robot 2 or the like actually acquired by the photographing unit, it is easy to grasp the position of the blind spot with respect to the robot 2 or the like. It is possible to easily apply, to the blind spot, measures for preventing entrance.

When the robot system 1 includes two or more security camera 3 and a space blocked by the stationary object X with respect to any one security camera 3 is defined as a blind spot, a sum of sets of spaces of blind spots calculated concerning the security cameras 3 only has to be calculated as the blind spot. When a space blocked by the stationary object X with respect to all the security cameras 3 is defined as a blind spot, a product set of spaces of blind spots calculated concerning the security cameras 3 only has to be calculated as the blind spot.

From the above-described embodiment, the following invention is derived.

According to an aspect of the present invention, there is provided a robot system including: a robot; a distance image sensor that temporally continuously acquires, from above an operating space of the robot, distance image information around the operating space; and an image processing device that processes the distance image information acquired by the distance image sensor, the image processing device defining, around the operating space, a monitoring area that includes a boundary for enabling entrance into the operating space from an outside, including a storing unit that stores reference distance image information, which is the distance image information of the boundary of the monitoring area in a state in which an object is absent in the monitoring area, and detecting, based on the distance image information acquired by the distance image sensor and the reference distance image information stored in the storing unit, whether a stationary object present in the monitoring area is blocking the boundary in a visual field of the distance image sensor.

According to this aspect, when the distance image information around the operating space is temporally continuously acquired from above the operating space of the robot by the distance image sensor, the acquired distance image information is processed by the image processing device. The image processing device defines, around the operating space of the robot, the monitoring area including the boundary for enabling entrance into the operating space from the outside. Consequently, when an operator or the like enters the monitoring area across the boundary, distance information in any pixel in the distance image information changes over time. Consequently, it is possible to detect the entrance of the operator or the like into the monitoring area.

On the other hand, when the stationary object is disposed in the monitoring area, a change over time of the distance information in the distance image information does not occur. The stationary object is not detected as an entering object.

In this case, according to this aspect, the image processing device stores, in the storing unit, the reference distance image information, which is the distance image information of the boundary of the monitoring area in the state in which an object is absent in the monitoring area, and detects, based on the reference distance image information and the distance image information acquired by the distance image sensor, whether the stationary object present in the monitoring area is blocking the boundary in the visual field of the distance image sensor.

When the stationary object is blocking the boundary, there is possibility that the operator or the like can enter, without being detected by the distance image sensor, the monitoring area from a blocked boundary portion through a blind spot hidden by the stationary object. That is, if the operator or the like enters the monitoring area from the boundary portion blocked by the stationary object through the blind spot, a change over time of the distance information in the distance image information does not occur. The entrance of the operator or the like cannot be detected. Therefore, it is possible to grasp presence or absence of the possibility of the entrance through the blind spot formed by the stationary object by detecting presence or absence of the boundary blocked by the stationary object. When it can be determined that there is the possibility of the entrance, it is possible to apply measures for preventing the entrance.

In the aspect, the image processing device may include an informing unit that, when the image processing device determines that the stationary object is blocking the boundary, calculates size of a space blocked by the stationary object and informs when the calculated size of the space exceeds a predetermined threshold.

With this configuration, it is possible to determine whether the operator or the like can pass or hide in the blind spot formed by the stationary object. When the size of the space exceeds the predetermined threshold, the informing unit informs to that effect. When the informing unit informs to that effect, it is possible to apply measures for preventing the entrance.

In the aspect, the image processing device may calculate a minimum cross-sectional area of the space as the size of the space.

With this configuration, it is possible to determine whether the operator or the like can pass or cause a part of the body to enter the blind spot formed by the stationary object. When the size of the space exceeds the predetermined threshold, the informing unit informs to that effect. When the informing unit informs to that effect, it is possible to apply measures for preventing the entrance.

In the aspect, the image processing device may calculate a minimum dimension of a cross section of the space as the size of the space.

With this configuration, it is possible to determine whether the operator or the like can pass or cause a part of the body to enter the blind spot formed by the stationary object. When the size of the space exceeds the predetermined threshold, the informing unit informs to that effect. When the informing unit informs to that effect, it is possible to apply measures for preventing the entrance.

In the aspect, the image processing device may include a display unit that, when the image processing device determines that the stationary object is blocking the boundary, displays a space blocked by the stationary object.

With this configuration, since the blind spot formed by the stationary object is displayed on the display unit, it is possible to easily apply measures for preventing entrance to the displayed blind spot.

In the aspect, the image processing device may include a three-dimensional-model generating unit that generates a three-dimensional model of the space, and the display unit may display the three-dimensional model of the space generated by the three-dimensional-model generating unit.

With this configuration, since the blind spot formed by the stationary object is displayed on the display unit as a three-dimensional model, it is possible to change and display an angle of the blind spot and easily apply, to the blind spot, measures for preventing the entrance.

In the aspect, the robot system may include a photographing unit that photographs the robot and a periphery of the robot, and the display unit may superimpose and display the three-dimensional model on an image acquired by the photographing unit.

With this configuration, since the blind spot formed by the stationary object is displayed on the display unit as a three-dimensional model to be superimposed and displayed on an image of the robot or the like actually acquired by the photographing unit, it is easy to grasp the position of the blind spot with respect to the robot or the like. It is possible to easily apply, to the blind spot, measures for preventing entrance.

The invention claimed is:

1. A robot system comprising:
    a robot; and
    a distance image sensor that temporally continuously acquires, from above an operating space of the robot, distance image information around the operating space,
    wherein a monitoring area is defined around the operating space which includes a boundary for enabling entrance into the operating space from an outside area,
    wherein the monitoring area has a square-annular shape with a rectangular fixed cross-section, which is described by an outer surface and a lower surface such that regions further on an outer side than the outer surface and further on a lower side than the lower surface are excluded from a monitoring target,
    wherein reference distance image information is stored in a storing unit, which is the distance image information of the boundary of the monitoring area in a state in which an object is absent in the monitoring area, and
    wherein, based on the distance image information acquired by the distance image sensor and the reference distance image information stored in the storing unit, a presence of a stationary object located in the monitoring area which is blocking the boundary in a visual field of the distance image sensor is detected.

2. The robot system according to claim 1, wherein a size of a space blocked by the stationary object is calculated and, when the calculated size of the space exceeds a predetermined threshold, a notice is output.

3. The robot system according to claim 2, wherein a minimum cross-sectional area of the space as the size of the space is calculated.

4. The robot system according to claim 2, wherein a minimum dimension of a cross section of the space as the size of the space is calculated.

5. The robot system according to claim 1, wherein a display unit displays a space blocked by the stationary object.

6. The robot system according to claim 5, wherein
    the display unit displays a three-dimensional model of the space.

7. The robot system according to claim 6, further comprising a photographing unit that photographs the robot and a periphery of the robot, wherein
    the display unit superimposes and displays the three-dimensional model on an image acquired by the photographing unit.

8. The robot system according to claim 1, wherein the robot system comprises a plurality of distance image sensors,
    wherein a size of a product set of a space blocked by the stationary object with respect to each of the plurality of distance image sensors is calculated, and when the calculated size of the product set exceeds a predetermined threshold, a notice is output.

* * * * *